United States Patent [19]

Fuhrhop

[11] 4,455,176
[45] Jun. 19, 1984

[54] POST-MIXED OXY-FUEL GAS CUTTING TORCH AND NOZZLE AND METHOD OF OXY-FUEL GAS CUTTING

[75] Inventor: Ronald E. Fuhrhop, West Nyack, N.Y.

[73] Assignee: Union Carbide Corporation, Danbury, Conn.

[21] Appl. No.: 495,166

[22] Filed: May 17, 1983

[51] Int. Cl.³ .............................................. B23K 7/00
[52] U.S. Cl. ..................................... 148/9 R; 266/48
[58] Field of Search ......................... 266/48; 148/9 R

[56] References Cited

U.S. PATENT DOCUMENTS

| | | | |
|---|---|---|---|
| 2,484,891 | 10/1949 | Jones | 148/9 |
| 2,536,201 | 1/1951 | Meincke et al. | 148/9 |
| 3,364,970 | 1/1968 | Dombruch et al. | 158/27.4 |
| 3,563,812 | 2/1971 | Nakanishi et al. | 148/9 |
| 4,173,499 | 11/1979 | Holemann | 148/9 |

Primary Examiner—W. Stallard
Attorney, Agent, or Firm—Eugene Lieberstein

[57] ABSTRACT

A combination cutting torch and nozzle assembly for post-mix oxy-fuel gas cutting using two separate annular steams of preheat oxygen gas surrounding the fuel gas stream with the inner annular oxygen stream directed to impinge the fuel gas stream very close to the point of discharge from the nozzle assembly. The nozzle assembly is secured to the torch head of the cutting torch by a hollow retaining nut which forms an annular gap with the nozzle assembly for discharging the outer preheat oxygen gas stream.

7 Claims, 3 Drawing Figures

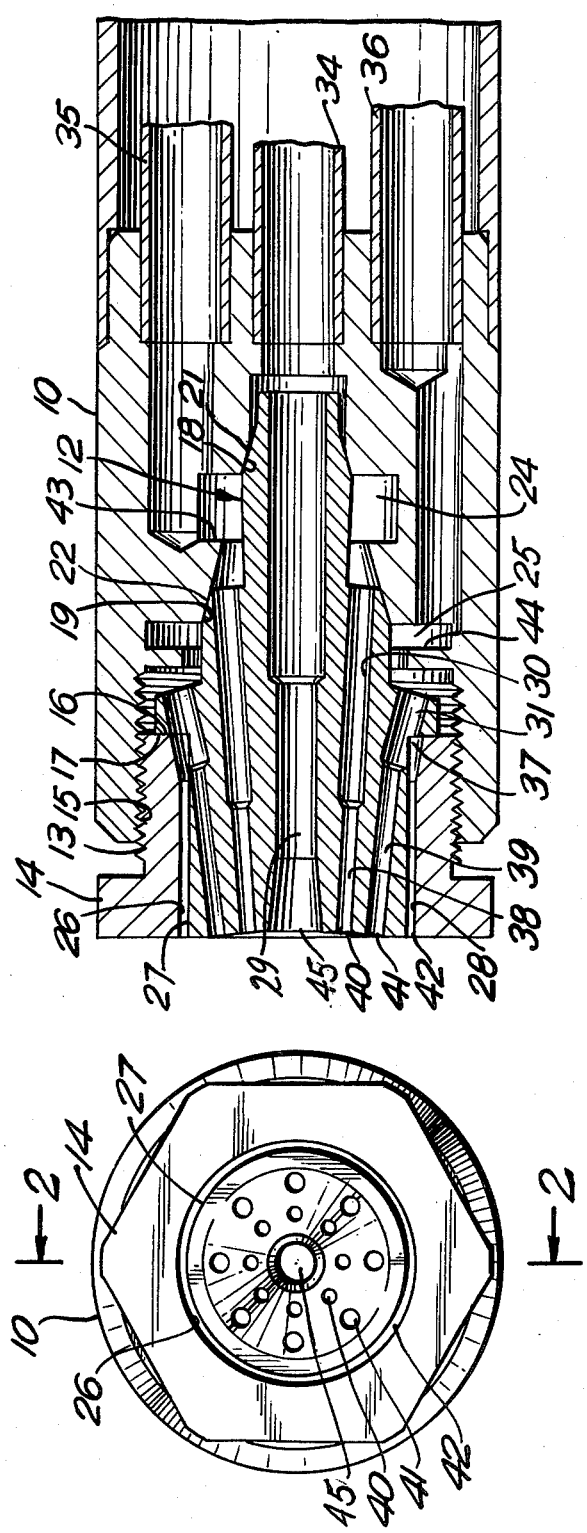

POST-MIXED OXY-FUEL GAS CUTTING TORCH AND NOZZLE AND METHOD OF OXY-FUEL GAS CUTTING

This invention relates to a cutting torch nozzle and method for mixing oxygen and fuel gas to form a post-mixed flame capable of preheating a steel workpiece to its molten temperature.

An oxy-fuel gas cutting torch is used to cut steel over a relatively wide range of diameters. In operation a stream of oxygen is mixed with a stream of fuel gas to form an oxy-fuel gas flame which is directed at a metal article for preheating the surface of the metal article to its oxygen ignition temperature. The fuel may be acetylene, propane, natural gas, etc. The oxygen and gas streams may be mixed internally within the cutting torch or external of the torch. In the former case mixing of the fuel gas and oxygen occurs in a "premix" nozzle whereas in the latter case the torch nozzle is referred to as a "postmix nozzle". Since there is no internal mixing of oxygen and fuel gas in the postmix nozzle there is no potential for flashback. Flashback constitutes a safety hazard to personnel and can cause extensive damage to equipment. The postmix nozzle also forms a longer heat zone compared to the premix nozzle which allows the torch to operate with a longer stand off which, in turn, increases the life of the nozzle.

In a conventional oxy-fuel cutting operation using a postmix nozzle the workpiece is heated by a preheat flame formed by surrounding the jet of cutting oxygen with a stream of fuel gas which in turn is surrounded by an outer stream of oxygen. The outer stream of oxygen is provided as a shield curtain for protecting the stream of fuel gas from the ambient atmosphere.

The cutting operation does not begin until the surface of the steel workpiece is preheated to its molten temperature. The time it takes for the steel workpiece to reach molten temperature is called the preheat time. It has been discovered in accordance with the present invention that the efficiency of the post mixed flame to preheat the steel workpiece can be substantially increased by employing two distinctively separate annular streams of preheat oxygen gas in a substantially concentric relationship surrounding the fuel gas stream. The inside stream of preheat oxygen gas, hereafter called the primary preheat oxygen stream, should be discharged from the nozzle in a direction to impinge the fuel gas stream as relatively close as possible to the nozzle discharge end. The outer preheat oxygen stream, hereafter called the secondary preheat oxygen stream, is preferably directed to exit parallel to the jet of cutting oxygen and has a higher flow rate than the primary preheat oxygen stream. The outer or secondary preheat oxygen stream functions to stabilize and shield the postmixed flame whereas the inner or primary preheat oxygen stream has been found to improve the efficiency of the cutting torch in preheating the surface of the steel workpiece.

Accordingly, it is the principle object of the present invention to provide a post-mixed nozzle for a cutting torch and to a method for forming a highly efficient post-mixed cutting flame.

Other objects and advantages of the present invention will become apparent from the following detailed description of the invention when read in conjunction with the accompanying drawings of which:

FIG. 1 is a front elevation of the post mixed cutting nozzle of the present invention;

FIG. 2 is a sectional view of the post mixed cutting nozzle of FIG. 1 taken along the lines 2—2 of FIG. 1.

Figure 3:
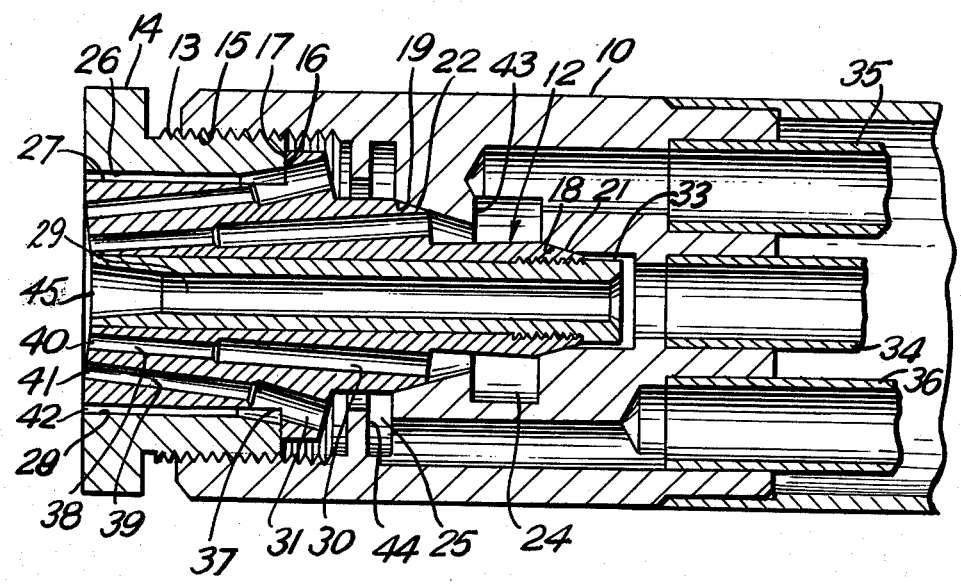
FIG. 3 is a sectional view of an alternative embodiment for the post mixed cutting nozzle shown in FIG. 2.

Referring now to FIGS. 1 and 2 inclusive in which the combination of torch and nozzle assembly of the present invention is illustrated comprising a torch head 10, a nozzle 12 and a hollow retaining nut 14. The torch head 10 has an internally threaded front end 15 for threadably engaging the outer threads 13 of the retaining nut 14. The nozzle 12 has a mounting flange 16 which engages the top face 17 of the retaining nut 14 when assembling the components into the torch head 10. The nozzle 12 has a plurality of beveled surfaces 18 and 19 which, upon tightening the retaining nut 14 mate with complimentary conical seating surfaces 21 and 22 in the torch head 10 to form annular distribution chambers 24 and 25 between the nozzle 12 and the torch head 10. The retaining nut 14 is hollow with its interior surface 26 conforming to the shape of the nozzle 12 and having a diameter which is larger than the corresponding exterior surface 27 of the nozzle 12 so as to a form a discharge orifice 28 between the retaining nut 14 and the nozzle 12. The discharge orifice 28 terminates in a exit opening 42 which may be an annular opening or a series of closely spaced holes of any geometry. A gas baffle 43 and 44 is located in each annular distribution chamber 24 and 25. Each gas baffle 43 and 44 may be integrally formed as part of the torch head 10 so that they project into the annular distribution chambers 24 and 25 or may be formed as projecting ridges from the nozzle 12.

The nozzle 12 has a central cutting bore 29 which terminates in an exit opening 45 and a first and second set of multiple passageways 30 and 31 spaced apart from one another in a substantially concentric arrangement surrounding the central cutting bore 29. The passageways 30 and 31 feed into a multiple number of discharge orifices 38 and 39 which terminate in a number of exit openings 40 and 41 arranged in the form of two circular rings which are radially spaced apart relative to the longitudinal axis of the torch head 10. The discharge orifices 38 and 39 and exit openings 40 and 41 may represent either a series of holes or concentric slots and may be of any desired geometry. The first and second set of discharge orifices 38 and 39 may represent single or multiple holes drilled through the body of the nozzle 12 and preferably at an inclined angle to the longitudinal axis of the torch head 10 to cause the gases flowing through the passageways 30 and 31 to intersect the central cutting oxygen stream as will be more elaborately explained hereafter.

Cutting oxygen is fed from a supply source not shown through a conduit 34 leading into the center bore 29 of the nozzle 12. The central bore 29 is aligned with the oxygen supply conduit 34. The central bore 29 may be formed by machining a hole of predetermined size diameter through the body of the nozzle 12 or alternately as shown in FIG. 3 by using a hollow insert 33 with a presized central opening which forms the central cutting bore 29 for the nozzle 12. The use of the removable hollow insert 33 of FIG. 3 permits the size and shape of the cutting bore 29 to be readily changed to suit the cutting requirements and may increase the useful life of the nozzle 12.

Fuel gas is fed from a conventional source of supply, not shown, through a supply conduit 35 into the annular distribution chamber 24 from where it passes through the passageway 30 and then through the first set of inclined discharge orifices 38 from whence it exits through the exit opening 40. The first set of inclined discharge orifices 38 preferably form an included angle of between above 0 to 10 degrees with respect to the longitudinal axis of the torch head 10 with a 3 degree included angle being preferred. The discharge orifices 38 are inclined to cause the fuel gas to discharge in a stream converging upon the jet of cutting oxygen being discharged through the central bore 29. The cutting oxygen stream is at a substantially higher velocity relative to the velocity of the fuel gas stream causing the stream of fuel gas to be diverted upon contact with the oxygen stream into a direction substantially parallel to the cutting oxygen stream.

Preheat oxygen is fed through a conduit 36 into the annular distribution chamber 25 from where it feeds through the passageway 31 into the second set of inclined discharge orifices 39 from whence it exits through the exit openings 41. The preheat oxygen may also be supplied from the cutting oxygen supply conduit 34. In the latter case a passageway (not shown) would have to be formed in the nozzle 12 to connect the central bore 29 to the annular distribution chamber 25. The preheat oxygen is discharged through the discharge orifice 39 as the primary oxygen stream in a direction converging upon the cutting oxygen stream and accordingly intersects the diverted fuel gas stream very close to the discharge end of the nozzle 12. This enchances the post mixing of the fuel gas and preheat oxygen gas. The second set of inclined discharge orifices 39 may represent a series of drilled openings or an annular slot which is inclined to form an included angle relative to the longitudinal axis of the torch head 10 of between 2 to 20 degrees with 3 degrees being preferred.

The passageway 31 also feeds into the discharge orifice 28 between the retaining nut 14 and the nozzle 12 through an opening 37. Accordingly, oxygen gas will also flow from the annular distribution chamber 25 through the second set of passageway 31 and then through the opening 37 into the annular gap 28 from whence it will discharge through exit opening 42 as a secondary oxygen stream surrounding the primary preheat oxygen stream. Although the annular gap 28 is in the form of a slot a series of holes of any desired geometry may equally be used. The annular gap 28 should lie preferably concentric to the central cutting bore 29 so that the secondary oxygen stream exits from the nozzle 12 as a uniform annular envelop in a direction substantially parallel to the jet of cutting oxygen for protecting the post mixed cutting flame from the ambient atmosphere. The width of the annular gap 28 is readily varied by substituting a retaining nut 14 with a different size interior diameter.

It should be understood that although the secondary preheat oxygen stream is preferably discharged from the annular gap between the retaining nut 14 and the nozzle 12 it is obvious that the secondary preheat oxygen stream may be discharged through an opening formed in the body of the retaining nut or through a discharge opening formed in the body of the nozzle.

I claim:

1. In combination, an oxy-fuel gas cutting torch having a torch head, a post-mix nozzle assembly and a hollow retaining nut for coupling said nozzle assembly to said torch head and for forming a gas passageway between said nozzle assembly and the hollow interior of said retaining nut, said nozzle assembly comprising a nozzle having a central bore of predetermined geometry through which cutting oxygen gas is passed; a first and second set of discharge orifices extending through said nozzle and terminating in a number of exit openings arranged in an outer and inner concentric ring about said central bore, with said first set of discharge orifices connected to a conduit through which a supply of fuel gas is passed for discharge through said inner ring of exit openings; means for passing oxygen gas through said second set of discharge orifices and means connecting said gas passageway between said nozzle and said retaining nut to said second set of discharge orifices for supplying oxygen gas through said gas passageway.

2. In the combination of claim 1 wherein said first and second set of discharge orifices extend through said nozzle at an inclined angle relative to the longitudinal axis of said torch head with the inclined angle for said second set of discharge orifices forming an included angle of between 2 to 20 degrees.

3. In the combination of claim 2 wherein said nozzle assembly further comprises insert means having a central bore of predetermined geometry and being adapted to securely fit in the central bore of said nozzle assembly.

4. In the combination of claim 2 wherein the included angle for said second set of discharge orifices is about 3 degrees relative to the longitudinal axis of said torch head.

5. A method of oxy-fuel gas cutting using a cutting torch having a torch head and nozzle assembly for mixing fuel gas and oxygen external of the torch comprising the steps of supplying a cutting stream of oxygen through a central opening extending through said nozzle assembly; discharging fuel gas from said nozzle assembly through a first set of discharge orifices surrounding said central opening; discharging oxygen from said nozzle assembly through a second set of discharge orifices to form a first preheat annular stream of oxygen about said fuel gas stream and discharging oxygen from another gas discharge orifice to form a second preheat annular stream of oxygen surrounding said first preheat annular stream of oxygen with said first preheat annular stream being fed through said second set of discharge orifices at an angle of between 2 to 20 degrees relative to the longitudinal axis of the cutting torch so as to impinge said fuel gas stream very close to the point of discharge from said nozzle assembly.

6. A method of oxy-fuel gas cutting as claimed in claim 5 wherein said second preheat annular stream of oxygen is discharged from said torch in a direction substantially parallel to cutting stream of oxygen.

7. A method of oxy-fuel gas cutting as claimed in claim 6 wherein said second preheat annular stream of oxygen is discharged at a flow rate substantially greater than the flow rate of the primary preheat oxygen stream.

* * * * *